United States Patent [19]
Neal et al.

[11] Patent Number: 5,493,391
[45] Date of Patent: Feb. 20, 1996

[54] ONE DIMENSIONAL WAVEFRONT DISTORTION SENSOR COMPRISING A LENS ARRAY SYSTEM

[75] Inventors: Daniel R. Neal, Tijeras; Robert B. Michie, Albuquerque, both of N.M.

[73] Assignee: Sandia Corportion, Albuquerque, N.M.

[21] Appl. No.: 273,569

[22] Filed: Jul. 11, 1994

[51] Int. Cl.$^6$ .................. G01J 1/00; G01J 1/20
[52] U.S. Cl. ............ 356/121; 250/201.9; 250/208.1
[58] Field of Search ............ 356/121; 250/201.9, 250/201.1, 208.1

[56] References Cited

U.S. PATENT DOCUMENTS

| | | | |
|---|---|---|---|
| 4,141,652 | 2/1979 | Feinleib | 250/201.9 |
| 4,227,091 | 10/1980 | Sick | 356/430 |
| 4,799,791 | 1/1989 | Echizen et al. | 356/121 |
| 5,189,294 | 2/1993 | Jackson et al. | 356/121 |
| 5,233,174 | 8/1993 | Zmek | 356/121 |
| 5,351,209 | 9/1994 | Hayashi et al. | 250/208.1 |

FOREIGN PATENT DOCUMENTS

| | | | |
|---|---|---|---|
| 2808360 | 8/1979 | Germany | 356/121 |
| 55074407 | 6/1988 | Japan | 356/121 |

*Primary Examiner*—Frank Gonzalez
*Assistant Examiner*—Jason D. Eisenberg
*Attorney, Agent, or Firm*—George H. Libman

[57] ABSTRACT

A 1-dimensional sensor for measuring wavefront distortion of a light beam as a function of time and spatial position includes a lens system which incorporates a linear array of lenses, and a detector system which incorporates a linear array of light detectors positioned from the lens system so that light passing through any of the lenses is focused on at least one of the light detectors. The 1-dimensional sensor determines the slope of the wavefront by location of the detectors illuminated by the light. The 1 dimensional sensor has much greater bandwidth that 2 dimensional systems.

12 Claims, 4 Drawing Sheets

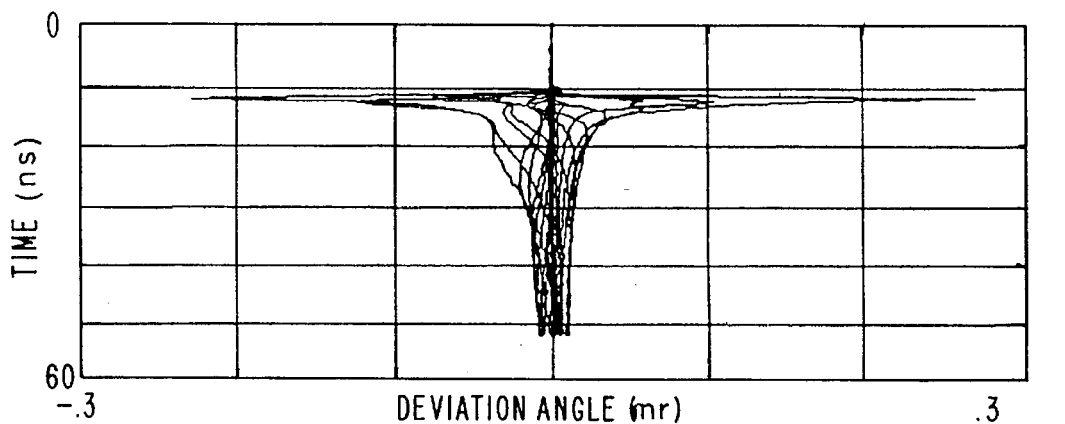
X: −1.17 −1.10 −1.04 −0.98 −0.92 −0.86 −0.79 −0.73 −0.67 −0.60
−0.54 −0.48 −0.42 −0.35 −0.29 −0.23 −0.16 −0.10 −0.04 −0.03 −0.09
FIG−4C
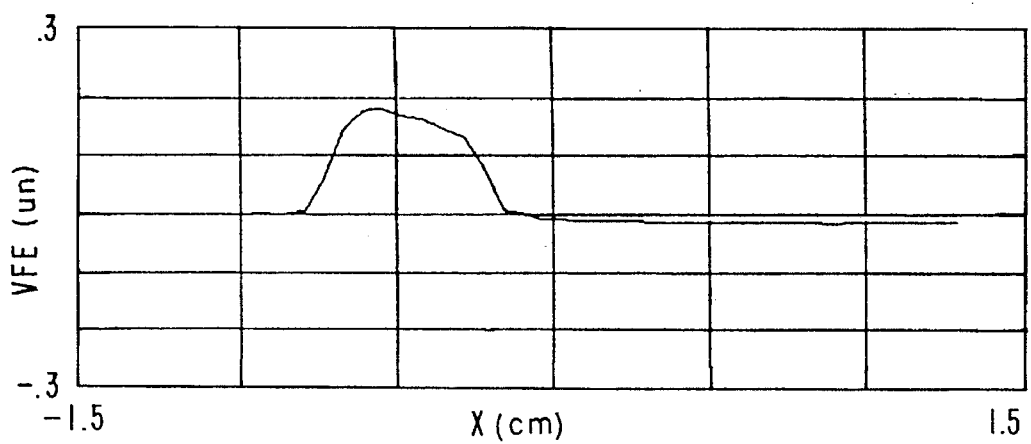
LINE:   29    12.6    AVE. TILT: −000391 nr  RMS TILT  .0346 nr
                     TOT. TILT: −0001779 nr  TOT. RMS  .011  nr
FIG−4D

ONE DIMENSIONAL WAVEFRONT DISTORTION SENSOR COMPRISING A LENS ARRAY SYSTEM

The United States Government has rights in this invention pursuant to Contract No. DE-AC04-76DP00789 between the Department of Energy and American Telephone and Telegraph Company.

BACKGROUND OF THE INVENTION

The usefulness of a laser often is dependent upon its output wavefront quality, since this determines the degree to which the beam may be focused. The wavefront quality of a laser system depends on the optical quality of all components in the optical train, including the laser media, the resonator optics and any relay or transport optics. The transient nature of the wavefront error is also important because the laser media index of refraction can vary significantly through temperature and flow effects. Furthermore, vibration, modal bending and other random events can affect the beam transport optics. Wavefront quality can be used to measure quantities of interest in incoherent and non-laser systems. In many flow systems, turbulence and macroscopic flow parameters can be measured by inferring the density from the index of refraction. For incompressible flow, the temperature may be inferred from such measurements.

In these applications time-dependent optical wavefront quality measurements are important. The measurements need considerable spatial and temporal resolution, and data analysis and reduction must be automatic.

In addition, other applications of a wavefront sensor include measuring the shape of objects such as disc drive platens and thin films during manufacture.

The Hartmann measurement technique was initially introduced using an opaque plate with several openings to mask the beam. It was used to diagnose imperfections in large telescopes by observing the position of each beam as it propagates through the optical system. Any deviations from the ideal path were attributed to optical imperfections or misalignment.

A common implementation of the Hartmann or Hartmann-Shack technique relies on measuring a change of spot position on a focal plane. By measuring the wavefront slope at different sample positions across the optical aperture, it does not rely on coherence, and inherently has no limit on its dynamic range or resolution. It does not require a reference beam for relative measurements. The invention described in this disclosure is based on a Hartmann technique.

The quantity of data that must be processed for prior art two-dimensional image is significantly greater than for the one-dimensional case of this invention. For scanned detectors, this limits the maximum bandwidth of the wavefront sensor since the maximum pixel rate is the same for both systems. For an N×N 2-D detector array operating at R pixel rate (pixels/sec), the wavefront sensor bandwidth is $R/N^2$. For a 1-D sensor, the bandwidth is $R/N$. For a 1024 element detector array operating at 20 Megapixels/sec, this corresponds to 20 Hertz bandwidth for 2-D data acquisition, and 19.5 KHz for the 1-D sensor. This increase is a key difference between the invention described here and the prior art since temporal resolution is critical for many applications. To make a two-dimensional wavefront sensor operate at higher bandwidth, the dynamic range, bandwidth or resolution must be reduced.

Shack-Hartmann sensing has been used extensively in optical fabrication and testing, astronomy, adaptive optics, and laser beam control. (D. Acton et al., "Solar imaging with a segmented adaptive mirror," *Appl. Optics*, 31(16), 3161–3169 (1 Jun. 1992)). The Shack-Hartmann sensor is used to measure the wavefront of a beam of coherent or incoherent light. It consists of an array of lenses that focus onto a detector array capable of measuring the position of the focused light. With the detector at the focal position, the focal spot position is independent of the intensity pattern across the subaperture, and depends only on the average slope of the wavefront. With many subapertures, the incident wavefront may be reconstructed by spatial integration.

For fluid mechanics problems, usually a laser is used to probe the flow under study, with density variations causing perturbations of the index of refraction of the medium. These index of refraction variations in turn lead to variations in the laser wavefront. The Shack-Hartmann sensor is used to determine these variations. Since the index of refraction usually depends strongly on the density of the fluid and only weakly upon temperature, it can be used to measure the density independent of any other variations in the flow.

There have been several recent developments that have made possible the development of useful wavefront sensors. These include the development of fast CCD area and line scan cameras, the development of micro-lens array manufacturing technology, and the improvement in computer data acquisition and processing equipment.

The Acton Shack-Hartmann wavefront sensor, cited above, uses discrete lenslets and quadrant cell detectors to make a limited number of measurements across the field. These sensors have the advantage of extremely high speed because of the many parallel connections, but have significantly reduced dynamic range, are complicated by the large numbers of connections and electronics and usually have limited net resolution. They are useful for closed loop adaptive optics systems where dynamic range is controlled by a deformable mirror. They can be used for fluid mechanics measurements only for either limited dynamic range effects, or in massively complicated adaptive optics facilities.

Another technique is to use a CCD camera coupled to a lenslet array to simplify the construction of the wavefront sensor. This technique is used extensively in astronomy and other adaptive optics (D. Kwo et al., "A Shack-Hartmann wavefront sensor using a binary optic lenslet array," SPIE Vol. 1544, *Miniature and Micro-Optics Fabrication and System Applications*, 66–74 (1991)). However, as the number of subapertures grows, bandwidth, resolution, dynamic range or dimensionality must be sacrificed. For adaptive optics systems, the deformable mirror can be used to extend the dynamic range, and hence some of these compromises can be avoided. However, a deformable mirror is extremely expensive and complicated, and is not likely to be applied to laboratory fluid mechanics measurements.

SUMMARY OF THE INVENTION

It is an object of this invention to provide a wavefront sensor with high measurement bandwidth.

It is another object of this invention to provide a wavefront sensor with a large dynamic range coupled with excellent sensitivity at high temporal and spatial resolution; and It is also an object of this invention to provide one-dimensional sensor of time-dependent optical wavefronts.

Additional objects, advantages, and novel features of the invention will become apparent to those skilled in the art upon examination of the following description or may be learned by practice of the invention. The objects and advantages of the invention may be realized and attained by means of the instrumentalities and combinations particularly pointed out in the appended claims.

To achieve the foregoing and other objects, and in accordance with the purpose of the present invention, as embodied and broadly described herein, the present invention may comprise a sensor for measuring wavefront distortion of a light beam as a function of time and spatial position, the sensor including a lens system consisting of a linear array of a plurality of lenses; a detector system consisting of a linear array of a plurality of light detectors spaced from said lens system so that light through any of said lenses is focused on at least one of the detectors, and light from more than one lens does not fall on any detector at the same time; and means for determining the slope of the wavefront by location of the detectors illuminated by the light.

BRIEF DESCRIPTION OF THE DRAWINGS

The accompanying drawings, which are incorporated in and form part of the specification, illustrate an embodiment of the present invention and, together with the description, serve to explain the principles of the invention.

FIGS. 4A–4D show the output of the invention.

DETAILED DESCRIPTION OF THE INVENTION

The design of a wavefront sensor is driven by several different quantities: temporal and spatial bandwidth, dimensionality, resolution and dynamic range. For CCD type sensors where the information is obtained sequentially, these parameters are often interrelated. For example, a large pixel count detector can be used to provide high spatial resolution or dynamic range, but will lead to lower temporal resolution. The proper wavefront sensor design is driven by the requirements of the application under study. However, it is possible to design wavefront sensors with broad applicability. Some design parameters for one-dimensional and two-dimensional wavefront sensors are given in Table 1.

| Quantity | 1-D WFS | 2-D WFS |
| --- | --- | --- |
| Frame rate | $f_p/N_p$ | $f_p/(N_x N_y)$ |
| Spatial resolution | d | d |
| Dynamic range | $N_p/(fd)$ | $N_p/(fd)$ |

The use of a one dimensional sensor instead of a two dimensional sensor greatly improves the detector bandwidth for a given spatial resolution or dynamic range. For a fixed pixel rate $f_p$, the sensor bandwidth scales as $f_p/N_p$ for a linear system verses $f_p/N_p^2$ for an area sensor where $N_p$ is the number of pixels per row in the camera. Thus for a 512 by 512 element area camera operating at 20 Mpixels/sec, the frame rate is 76 Hz, whereas for a line-scan camera with 512 pixels, the bandwidth is 39 kHz. Since often this large bandwidth is not needed, the line pixel count can be increased, thereby providing more dynamic range and/or resolution.

Figure 1:
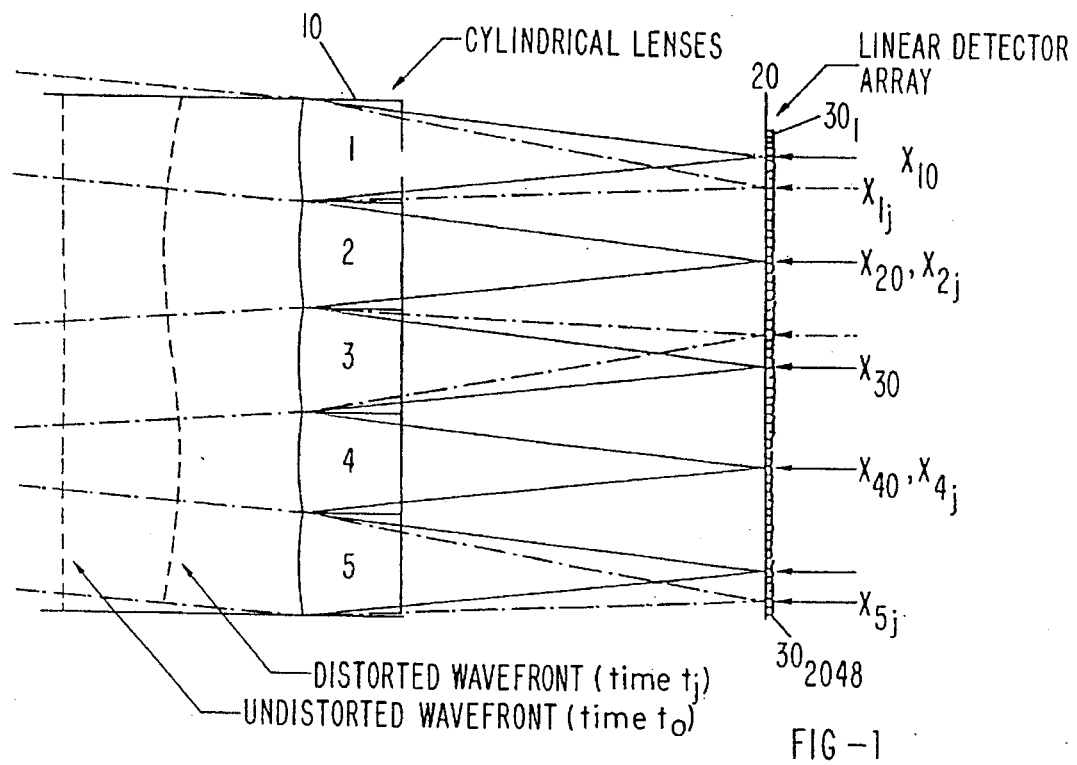
FIG. 1 shows a schematic representation of the optical system of this invention.

FIG. 1 shows a side view of a typical configuration of a wavefront sensor in accordance with this invention. A laser wavefront approaching a lenslet array 10 is seen to have no distortion at time $t_O$ and distortion at later time $t_j$. Unlike prior art Shack-Hartmann sensors with 2-dimensional K×L arrays of round lenslets, lenslet array 10 consists of a plurality of cylindrical elements 1–5 arranged in a line across the path of the wavefront. Undistorted light at each element n is focused along a line parallel to the axis of the element at a center position $x_{nO}$ on focal plane 20.

Figure 2:
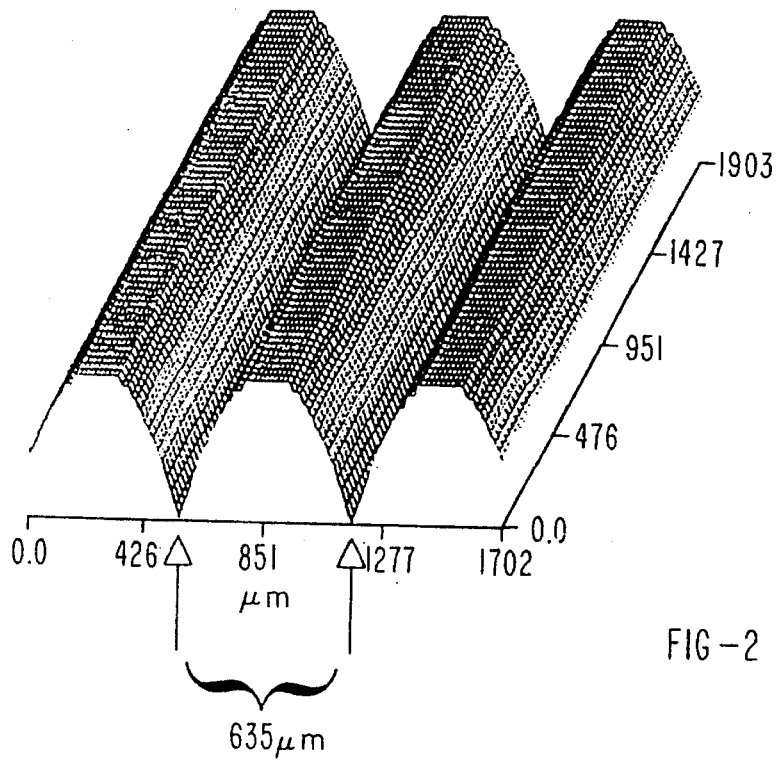
FIG. 2 shows a scan of a few elements of a cylindrical lens of the invention.

FIG. 2 shows a scan of a few cylindrical elements of array 10 in accordance with this invention. As illustrated, each of these elements has a diameter of 635 microns. Each element focuses to a line approximately 0.5" long at focal plane 20.

These elements may be constructed using conventional optical fabrication techniques; however, the fabrication and assembly of 10 and 20 element linear wavefront sensors requires 1/10 and 1/20 inch diameter optics. Assembly and handling of these small optics was extremely difficult and tedious, and resulted in inaccurate spacing of the focal spots (which could be calibrated out). To improve the resolution further, a monolithic method for constructing the lenslet arrays was needed.

One such technique relies on the use of binary optics (G. J. Swanson, "Binary Optics Technology: the Theory and Design of Multi-Level Diffractive Optical Elements", *MIT Lincoln Laboratory DARPA Technology Report*, 854 (1989)) to construct a discrete level lenslet array on a fused silica substrate. The lenslet array is constructed using photolithography and a series of reactive-ion etch steps to remove material from selected portions of the substrate. The lenslet array profile is built up through successive etch steps, each being twice the depth of the last. Thus four photolithography/etch steps will produce a lens profile with 16 levels. A sixteen level phase structure, as illustrated in FIG. 2, can be shown to be more that 99% efficient at focusing light.

Several lenslet arrays have been constructed using this technology. They have 40 lenslets across one inch with 10 or 7.6 cm focal length. Several lenslet arrays can be built on a single substrate. The high f# of approximately 157 designed with these optics simplifies the binary optics fabrication of the invention.

A further advantage to the binary optics techniques is the accuracy of lenslet placement. The focus spots are accurately positioned to within 0.5 μm. This allows the use of the sensor in an absolute mode for measuring optical components (or other absolute wavefront measurements). The alignment insensitivity of the wavefront sensor can be maintained if the average tilt is subtracted from the measured wavefront slope values.

Whereas prior art Shack-Hartmann sensors would have an M×N array of light detectors on focal plane 20, in accordance with this invention, focal plane 20 includes only a linear array of light detectors $30_n$ extending along a line perpendicular to the axes of elements 1–5, where n extends from 1 to the number of detectors (In FIG. 1, N=2048). The linear output from each lens element is intersected by the light detectors along focal plane 20.

Wavefront sensors with 10, 20 and 40 elements across a one inch aperture and 5, 10 and 20 cm focal lengths have been tested. These were built around high speed CCD diode array cameras having 256, 1024 and 2048 pixels extending in a line along focal plane 20. Each pixel typically has a diameter on the order of 12–16 microns. In this arrangement, light through each element 1–5 is focused into a line that illuminates approximately 7 pixels. In addition, light from each element can only illuminate pixels aligned with that element; that is, the line of focus from element 1 can never extend onto pixels that are illuminated by the line of focus from element 2. This unique construction ensures that the position of the focused image from any element is easily determined by the pixel having the brightest illumination, or by the centroid of the light illuminating several pixels.

Figure 3:
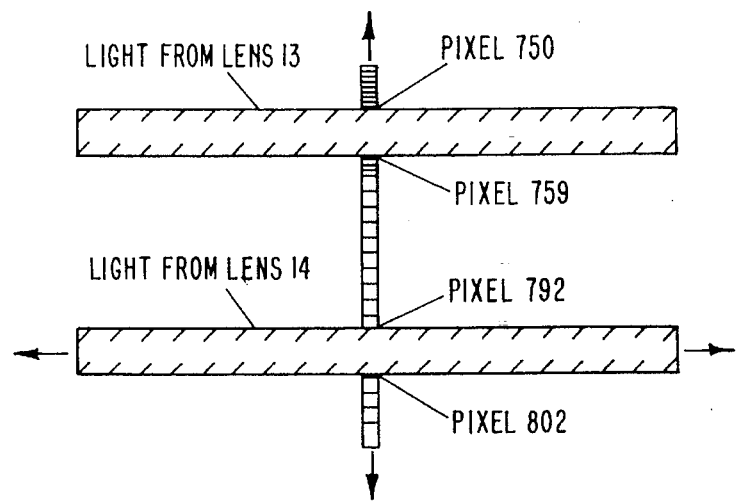
FIG. 3 is a detail view of the detector of this invention.

FIG. 3 shows a detail end view of light from lenslets 13 and and 14 of a 20 lenslet array hitting detectors in a 2048 pixel linear array of a camera. The vertical arrows on FIG. 3 indicate that the array of pixels extends upwards to pixel 1 and downwards to pixel 2048. The horizontal arrows indicate that each light beam from a cylindrical lenslet in accordance with the invention (which is seen in this example to have a width at the focal plane of about 9 pixels, or 120 microns) has a length on the order of 10 millimeters. While the prior art 2 dimensional lens and detector arrays are difficult to align, as a result of this construction, it is relatively easy to ensure that the long light beam intersects the detector array.

A typical 20 element sensor can operate at up to about 10 kHz frame rate (although it was used at 2.3 kHz because of data acquisition system limitations), has ±10 mrad dynamic range, and is sensitive to 0.5 μrad angular variations per subaperture. This corresponds to a change in wavefront error of 1/800 of a wave across the 1/20 inch subaperture.

Data acquisition consists of a synchronized transient digitizer that is used to record the pixel values. An output from the line scan camera that includes a synch pulse is used. The synch information is presently used by the data analysis software to determine the frame start times (index i). This operation could easily be performed electronically using a synch stripper or a frame grabber card.

Data analysis primarily consists of locating the positions of the peaks, converting this information to wavefront slope information, and then integrating to compute the wavefront.

Figure 4A:
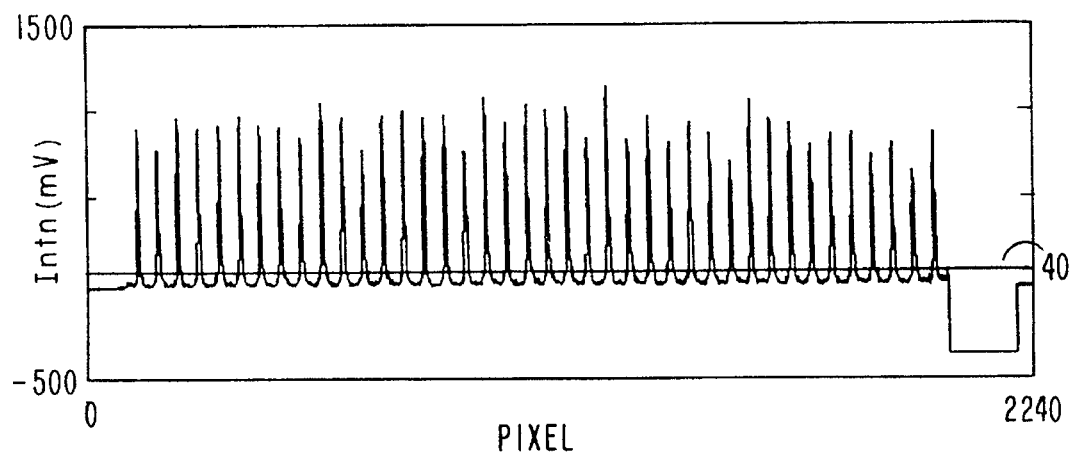

FIG. 4(a) shows a typical display of the output of all pixels for a study of the vapor field of an acetone droplet. Each peak represents the detected output of a lens element. The position of the peaks along the detector array varies with time as a function of distortion caused by the droplet. Since the only signal of interest is the location of the peak, a voltage threshhold (represented by the horizontal line 40 above the base of the signal) is set to exclude most of the noise associated with these measurements. This threshhold has been found to be effective in producing high sensitivity wavefront sensors as it eliminates the effects of noise at pixel locations where no light is incident.

The first step in signal analysis is to locate positions of the focal spots $\hat{x}_{i,j}$ using a centroid or other analysis technique. A set of windows is usually defined in which centroids are computed. The window location can be allowed to float based on an automatic tracking scheme, or can be fixed through user adjustment.

Figure 4B:
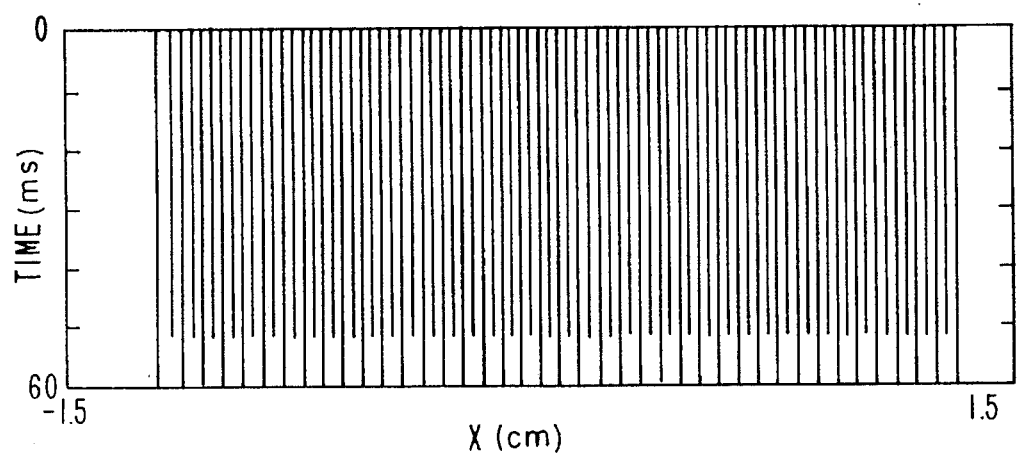

FIG. 4(b) shows a time slice from this step of the data analysis. The longer vertical lines 50 extending to the baseline indicate the windows for centroid computation for each lens element. The relative position of the shorter line with respect to each pair of longer lines 50 indicates the position of the focal spot that was calculated for that lens element.

To minimize effects caused by noise that is far from the peak location, the data threshold operation discussed above is usually performed. This step can greatly improve the noise rejection of the system by a factor of approximately 200. The threshhold is set prior to computing the centroids.

The next step is to compute wavefront slopes using the spot positions. The wavefront slope $$\left(\frac{d\phi_j}{dx}\right)_i = \frac{\hat{x}_{ij} - \hat{x}_{i0}}{f}$$

where i is the spot position index, j is the time index and f is the lenslet focal length. $\hat{x}_{iO}$ is the initial location for each peak, which may be determined the results of a calibration step.

A typical screen showing wavefront slopes computed from the aforementioned formula is presented in FIG. 4(c). The slope at each lenslet is represented as one of the lines of the figure.

Once the wavefront slopes have been determined, the waveform is integrated by a typical formula such as $$\phi_k = \sum_{i=1}^{k} \left(\frac{d\phi_j}{dx}\right)_i$$

to provide the data analysis of FIG. 4(d).

This analysis technique has been proven to be extremely effective for most fluidynamic measurements. The operator is free to concentrate on the physics of the fluid mechanics, rather than on the specifics of wavefront sensing. In addition, a number of calibration steps are available for further refining the data analysis to allow absolute calibration of the sensor ($\hat{x}_{i,o}$ is computed from a separate calibration measurement) or provide consistent analysis for several separate measurements.

With a typical sensor (40 element, 10 cm focal length, 2048 element array) the focal spots are positioned 635 μm or 48 pixels apart. This yields a dynamic range (without automatic spot tracking) of 6.35 mrad (or 6.4 waves per subaperture). In practice, it has been found that up to 20 mrad dynamic range is usable with spot tracking. For the same sensor the focal spot occupies about 15 pixels (between the first two zeros of the point spread function). With thresholding, 10 pixels are usually used in the centroid computation. It can be shown that for a weak aberration across the small subaperture, the location of the brightest point in the point spread function represents the average wavefront slope over the aperture. (see T. McKechnie, "Atmospheric turbulence and the resolution limits of large ground-based telescopes," *J. Opt. Soc. Am. A*, 9(11), 1937–1954 (1992)). For these small subapertures, the aberrations are small even for large wavefront gradients. Hence the threshold operation does not degrade the accuracy of the measurement. It does eliminate a significant noise contribution in the calculation that is heavily weighted. An expression for the rms wavefront error, $\phi_{rms}$, introduced by photon noise for typical wavefront sensor parameters is:

$$\phi_{rms} = \frac{d\Delta}{f\pi} \left(\frac{m}{N_0}\right)^{1/2}$$

where m is the number of pixels involved in the centroid calcuation, d is the lenslet diameter, $\Delta$ is the pixel width, f is the lenslet focal length and $N_O$ the number of photo electrons required to saturate the detector. A typical value for this expression is 0.1 to 0.2 nm. Values in the range 0.2 to 0.3 nm have often been observed experimentally. For a 40 element sensor, this represents 1/5000–1/3000 of a wave (over each 0.635 mm diameter subaperture). Since the wavefront sensor is often used in a mode where the calibration is made a few milliseconds before the measurement, the resulting accuracy over the entire aperture is on the order of 1/800 to 1/500 of a wave. This result is on the order of 10 times higher than results obtained from commercial interferometers.

As discussed above, it is seen that the small subaperture size, long lenslet focal length, large pixel count wavefront sensor combine to yield an extremely high resolution, large dynamic range, low noise, high bandwidth sensor.

It is also desirable to provide a device in accordance with this invention where the diameter of the lens array 10 is different than the length of detector array 30. This result can be accomplished by arranging the lenslets on a curved surface or by providing correcting optics between the lenslets and the focal plane. However, both of these alternatives have drawbacks. Constructing the lenslets on a curved surface is a more difficult manufacturing process, and correcting optics produce additional distortion that must be accounted for before accurate measurements can be obtained.

Figure 5:
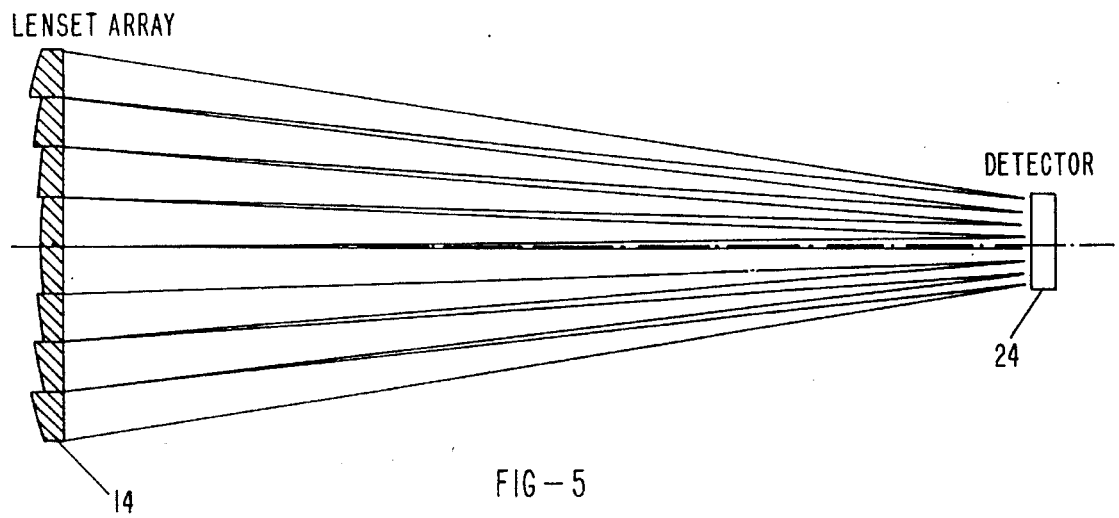
FIG. 5 shows an alternative lens array for a second embodiment of the invention.

FIG. 5 shows another embodiment of the invention that overcomes these disadvantages. In the cross-sectional view of this embodiment, individual lenslets of array 14 are seen to be shaped to focus impinging light in lines at the appropriate locations on focal plane 24. The design of individual elements is an elementary matter for those of ordinary skill in optics. The device may readily be constructed using the binary optic construction technique described herein.

The particular sizes and equipment discussed above are cited merely to illustrate a particular embodiment of this invention. It is contemplated that the use of the invention may involve components having different sizes and shapes as long as the principle, using a linear array of lenslets with a linear detector array, is followed. It is intended that the scope of the invention be defined by the claims appended hereto.

We claim:

1. A sensor for measuring wavefront distortion of a light beam as a function of time and spatial position, said sensor comprising:

a lens system consisting of a linear array of a number of lenses, said number being greater than one, each of said lenses focusing to a line;

a detector system consisting of a linear array of a number of light detectors, said detector system being spaced from lens system so that light through any of said lenses is focused on at least one of said detectors, no detector receiving light from more than one lens at any instant time, the line from each lens being focused perpendicular to the detector array; and means for determining a wavefront slope of the light impinging on said lens systems from the location of light detectors illuminated by the light.

2. The sensor of claim 1 wherein said detector system is parallel to said lens system.

3. The sensor of claim 1 wherein the number of lenses is less than the number of detectors.

4. The sensor of claim 3 wherein said detector system is parallel to said lens system.

5. The sensor of claim 1 wherein each lens comprises a cylindrical lens having a longitudinal axis perpendicular to said linear lens array.

6. The sensor of claim 5 wherein said detector system is parallel to said lens system.

7. The sensor of claim 5 wherein a profile of each lens consists of a plurality of steps formed by binary optics.

8. The sensor of claim 7 wherein a depth of each step of the lens is twice a depth of a proceeding step.

9. The sensor of claim 1 wherein the light from each lens is focused on a set of detectors, wavefront slope being determined from an illumination pattern of detectors within the set.

10. The sensor of claim 9 wherein each lens comprises a cylindrical lens having a longitudinal axis perpendicular to said lens array.

11. The sensor of claim 1 wherein a length of the lens system is approximately the same as the length of the detector system.

12. The sensor of claim 1 wherein the length of the lens system is greater than the length of the detector system.

\* \* \* \* \*